United States Patent
Francis et al.

(10) Patent No.: US 10,878,058 B2
(45) Date of Patent: Dec. 29, 2020

(54) SYSTEMS AND METHODS FOR OPTIMIZING AND SIMULATING WEBPAGE RANKING AND TRAFFIC

(71) Applicant: T-Mobile USA, Inc., Bellevue, WA (US)

(72) Inventors: Peter M. Francis, Bellevue, WA (US); Aaron M. Wester, New York, NY (US); Tanya Goodman, New York, NY (US)

(73) Assignee: T-Mobile USA, Inc., Bellevue, WA (US)

(*) Notice: Subject to any disclaimer, the term of this patent is extended or adjusted under 35 U.S.C. 154(b) by 614 days.

(21) Appl. No.: 15/625,901

(22) Filed: Jun. 16, 2017

(65) Prior Publication Data
US 2018/0365253 A1    Dec. 20, 2018

(51) Int. Cl.
| G06F 16/958 | (2019.01) |
| G06F 16/22 | (2019.01) |
| G06F 16/9535 | (2019.01) |
| G06F 16/2457 | (2019.01) |
| G06F 16/951 | (2019.01) |
| G06F 16/93 | (2019.01) |

(52) U.S. Cl.
CPC ........... *G06F 16/958* (2019.01); *G06F 16/22* (2019.01); *G06F 16/24578* (2019.01); *G06F 16/94* (2019.01); *G06F 16/951* (2019.01); *G06F 16/9535* (2019.01)

(58) Field of Classification Search
CPC .... G06F 16/958; G06F 16/22; G06F 16/9535; G06F 16/24578; G06F 16/94; G06F 16/951
See application file for complete search history.

(56) References Cited

U.S. PATENT DOCUMENTS

| 8,363,544 B2 * | 1/2013 | Fishteyn | G06Q 30/0247 |
| | | | 370/229 |
| 8,554,854 B2 | 10/2013 | Benyamin et al. | |
| 9,614,869 B2 * | 4/2017 | Prieto Alvarez | G06F 16/951 |

(Continued)

OTHER PUBLICATIONS

The PCT Search Report and Written Opinion dated Oct. 10, 2018 for PCT Application No. PCT/US2018/037891, 13 pages.

*Primary Examiner* — Jensen Hu
(74) *Attorney, Agent, or Firm* — Lee & Hayes, P.C.

(57) ABSTRACT

This application is directed to quantitatively optimizing and simulating webpage search engine ranking, webpage traffic associated with a search engine, and user interactions with webpage content leading to conversions. For example, a search engine response model can determine how ranking factors of a webpage can affect a ranking of the webpage with respect to a keyword. A ranking factor response model can determine how attributes of a webpage affect the ranking factors. An addressable market can be determined for a webpage by determining keywords and key phrases associated with a webpage, as well as a volume of web traffic associated with the keywords and key phrases. As attributes of a webpage are adjusted, the operations herein can simulate an expected webpage ranking and traffic volume based on the adjusted attributes, and identify optimization factors leading to increased ranking, traffic, and conversions by level of influence for targeted webpages.

20 Claims, 5 Drawing Sheets

(56) References Cited

U.S. PATENT DOCUMENTS

| | | | |
|---|---|---|---|
| 9,665,659 B1* | 5/2017 | Rachmeler | G06F 11/3438 |
| 2005/0228797 A1* | 10/2005 | Koningstein | G06Q 30/02 |
| 2005/0240394 A1* | 10/2005 | Oda | G06F 16/353 |
| | | | 704/9 |
| 2007/0027864 A1* | 2/2007 | Collins | G06Q 30/0211 |
| 2007/0106641 A1* | 5/2007 | Chi | G06F 16/9558 |
| 2008/0065440 A1 | 3/2008 | Graham et al. | |
| 2010/0057717 A1* | 3/2010 | Kulkarni | G06F 16/951 |
| | | | 706/12 |
| 2011/0040717 A1* | 2/2011 | Rho | G06F 16/951 |
| | | | 706/50 |
| 2012/0166413 A1* | 6/2012 | LeBaron | G06F 16/958 |
| | | | 707/709 |
| 2013/0304818 A1* | 11/2013 | Brumleve | G06Q 30/02 |
| | | | 709/204 |
| 2014/0201227 A1* | 7/2014 | Hamilton-Dick | G06F 16/9535 |
| | | | 707/758 |
| 2014/0297618 A1* | 10/2014 | Sherman | G06F 16/9558 |
| | | | 707/710 |
| 2015/0088846 A1* | 3/2015 | Roe | G06F 16/958 |
| | | | 707/706 |
| 2015/0324409 A1* | 11/2015 | Park | G06F 16/2282 |
| | | | 707/723 |
| 2015/0379141 A1 | 12/2015 | Stouffer et al. | |
| 2016/0092573 A1 | 3/2016 | Stouffer et al. | |
| 2016/0335354 A1 | 11/2016 | Rama et al. | |
| 2018/0165717 A1* | 6/2018 | Fidler | G06Q 30/0275 |

\* cited by examiner

SYSTEMS AND METHODS FOR OPTIMIZING AND SIMULATING WEBPAGE RANKING AND TRAFFIC

BACKGROUND

Network traffic arrives at webpages from a variety of sources, including at least direct addressing, digital advertising campaigns, paid search, and natural search. For example, direct addressing can include a user inputting an URL or address in a web browser to navigate to a webpage. Digital advertising can include text, images, and/or video presented in connection with various webpages that direct users to navigate to a webpage. Paid search traffic can result from presenting a webpage address in connection with search results for a fee. And natural search traffic can result from user selection of "organic" results of a search query of a search engine, for example.

Search engine optimization services can include processes of affecting the visibility of natural search results (e.g., unpaid search results). Optimizing a webpage can include editing content of the webpage or otherwise changing aspects of a user experience to increase the relevance of the webpage to specific keywords. It can be difficult, however, to evaluate the effect of optimizing a webpage prior to implementing such changes, which can introduce uncertainty into the process of search engine optimization.

SUMMARY

The systems, devices, and techniques described herein are directed to quantitatively optimizing and simulating webpage search engine ranking, webpage traffic associated with a search engine, and user interactions with webpage content leading to conversions. For example, the systems, devices, and techniques described herein can utilize a search engine response model to determine how ranking factors of a webpage can affect a ranking of the webpage with respect to a particular keyword. A ranking factor response model can be utilized to determine how attributes of a webpage affect the ranking factors. An addressable market can be determined for a webpage by determining keywords and key phrases associated with a webpage, as well as a volume of web traffic associated with the keywords and key phrases. As attributes of a webpage are adjusted, such as a size of images on the webpage, the operations and calculations herein can simulate an expected webpage ranking and an expected level of traffic based on the adjusted attributes, determine the most effective algorithmic regression model to predict optimization opportunities with a high level of accuracy and confidence, and/or identify the most influential optimization factors leading to increased ranking, traffic, and conversions by level of influence for targeted webpages.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to optimizing and simulating webpage ranking and webpage traffic with respect to search engine results. As users input one or more search terms into a search engine, the search engine can return a list of webpages in ranked order. The ranking of a webpage by a search engine and the webpage traffic associated with the ranking can be a baseline ranking and traffic for determining an efficacy of webpage optimization, as discussed herein.

Search engine response models can be utilized to determine how aspects of a webpage can affect a ranking of the webpage with respect to a particular keyword. For example, and without limitation, a ranking of a webpage can be based in part on ranking factors such as page load speed, webpage security, and webpage engagement time. Further, ranking factor response models can be utilized to determine how individual attributes of the webpage can be relationally influenced by targeted ranking factors. For example, an individual ranking factor (e.g., page load speed) can be based on exhibited associations with attributes such as a size of images on a webpage, whether content of the webpage is optimized for mobile browsers, a physical location of a server hosting the webpage relative to users, and so on. Thus, the search engine response models and the ranking factor response models can be used to determine what ranking factors of the webpage affect a ranking outcome of the webpage, and to what degree highly correlated attributes of the webpage can be modified when coupled to the effect of associated ranking factor optimizations.

An expected volume of traffic associated with a webpage can be determined based on a variety of factors, such as a ranking of the webpage, discussed above, and a total addressable market associated with keywords, key phrases, and webpages. A total addressable market can be determined based on an analysis of online content, such as social networking content, to determine primary seed keywords and relevant related keywords that generate traffic to a webpage. For example, the techniques discussed herein can include the quantified identification of a primary seed term (e.g., "phone") and determining related keywords and key phrases (e.g., "broken phone," "smashed phone," "water damage," etc.). In some instances, a list of keywords/key phrases can be based on an n-gram analysis and exploratory vector-based spatial proximity analysis of various social networking content.

An apportioned traffic volume may be quantified based at least in part on the seed term and the related list of keywords/key phrase parameters. For example, for individual rankings of a webpage in search results associated with the keywords, the operations can include determining a selection rate associated with individual keyword rankings. The selection rate can indicate a likelihood or probability that a search result at a particular ranking will be selected, when evaluated regressively. An expected volume of traffic associated with keywords/key phrases can be based at least in part on estimates derived from information associated with paid search terms (e.g., a paid search term can include an estimate of a number of web searches associated with the search term over time). Further, an expected volume of traffic can be based on web analytics associated with the current webpage (e.g., an actual volume of traffic associated with a webpage over a selected historic range of time). The total addressable market can further be adjusted or calibrated based on other market specific factors, such as geographical locations associated with goods or services, a type of goods or services offered, etc.

In some instances, determining a total addressable market can include extracting data from social media channels to determine relevant keywords associated with a particular market. For example, operations can include determining that a first user utilized a first keyword in a search engine to arrive at content, while a second user utilized a second keyword in the search engine to arrive at the same content. Further, operations can include determining that users who searched using a third keyword to arrive at content also used a fourth keyword to arrive at the same content. Extracting data from social media channels can include determining user engagement, reactions, post type, and lifetime value published priority associated with various content, and performing an n-gram analysis and vector-based spatial proximity analysis on the content to determine relevant lists of keywords/key phrases. In some instances, relevant lists of keywords/key phrases can be categorized and partitioned by geolocation, by competition, by device type (mobile, desktop, tablet), or by region size (local, regional, global). In some instances, lists of keywords/key phrases can be based on a number of users associated with content type (e.g., a number of users associated with "shares," "likes," and/or "follows"), and/or a computational distance (e.g., based on path traversal and measured distance of the hypotenuse (normalized magnitude) of node/edge vector-based relationships in a social network graph) of a cluster of users orbiting content based on the influence by types of content (such as links, videos, titles, descriptions, photos, etc.).

Thus, the techniques discussed herein can utilize one or more search engine response models, one or more ranking factor response models, and a total addressable market calibrated based on volume and market-specific factors to optimize and predictively simulate how changes to a webpage can affect a ranking and/or traffic of the webpage based on search engine results.

The optimization and prescriptive simulation processes discussed herein can be used to determine whether updates to a webpage are efficient from a resources perspective (e.g., monetary cost, time, processing power, bandwidth, etc.).

Thus, operations described herein with respect to optimizing and simulating ranking and traffic associated with a webpage can be said to be rooted in networking technology. Further, the operations described herein can simulate a ranking and/or traffic of a webpage based on any number of changes to a webpage that can affect one or more ranking factors associated with a search engine response model.

Thus, the operations discussed herein can improve the utilization of resources by targeting changes to webpages based on quantifiable feedback, rather than implementing changes where the changes are not needed, so that a relatively large impact on search ranking and/or traffic can result from such targeted implementations.

In some instances, simulating ranking and traffic of a webpage can provide insight into expected network traffic for a webpage, which can be used to predict expected network traffic for making determinations to update or upgrade network topologies. In some instances, webpages associated with particular keywords can be hosted on servers based on expected volume of traffic. For example, webpages with high expected traffic volume can be hosted on distinct server instances to reduce congestion and/or improve aggregate network capacity.

In this manner, the systems, devices, and techniques described herein improve a functioning of a computing device by providing operations that can simulate webpage ranking and traffic to predict expected network traffic for a webpage associated with keywords. In some instances, network topologies can be based at least in part on expected keyword-based network traffic, to improve a capacity of one or more webpages to handle traffic.

The systems, devices, and techniques described herein can be implemented in a number of ways. Example implementations are provided below with reference to the following figures.

Figure 1:
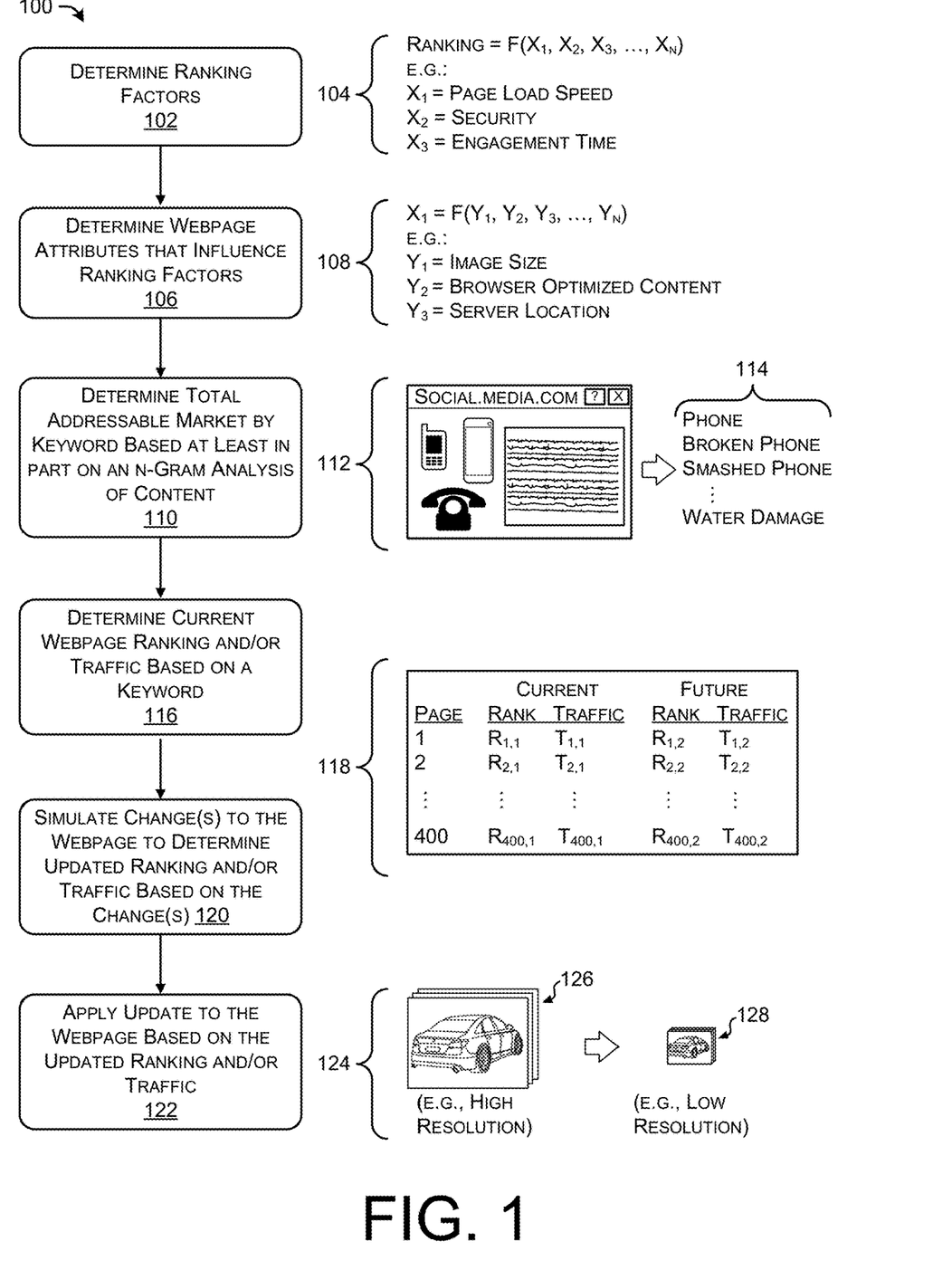
FIG. 1 illustrates a pictorial flow diagram of an example process for optimizing and simulating webpage ranking and traffic associated with a webpage based on search engine results.

FIG. 1 illustrates a pictorial flow diagram of an example process 100 for optimizing and simulating webpage ranking and traffic associated with a webpage based on search engine results.

At 102, the operation can include determining ranking factors. For example, the ranking factors can be associated with a particular search engine algorithm and/or search engine response model, and can represent aspects and/or attributes of a webpage that determine, in part, a ranking of the webpage in search results presented by the search engine with respect to a keyword. In an example 104, a search engine ranking of a webpage can be based on a number of ranking factors, represented as Ranking=$F(X_1, X_2, X_3, \ldots, X_N)$. In some instances, the ranking factor $X_1$ can correspond to a page load speed; the ranking factor $X_2$ can correspond to a webpage security level; and the ranking factor $X_3$ can correspond to a webpage engagement time. As can be understood in the context of this disclosure, any number or type of ranking factors can be used to estimate a ranking of a webpage, for example, in the context of a search engine response model. For instance, additional examples of ranking factors include, but are not limited to: webpage length; URL length; total number of links on a webpage; number of keyword matches in body text of a webpage; etc. In some instances, the ranking factors can determine a ranking of a webpage based at least in part on an adjusted correlation coefficient, which can be accurately calculated using a normally distributed Fisher's Z transformation conversion process as exhibited in the following exemplary pseudocode.

```
ΣRanking(F(X_N|Y_N)) {
    Adj.Rho(A.R) {
        RankingCategory(R.C) {
            R.C(!Null) For Each R.C ∈ F(X_N|Y_N).Adj(A.R); {
                RankingFactor(R.F) {
                    R.F(!Null) For Each R.F ∈ F(X_N|Y_N).Adj(A.R)
                }
            }
        }
    }
}
```

```
    r(COR(ΣR.C(R.F)));
    FisherZ(N₁,...,Nx) ← r(COR(ΣR.C(R.F)));
    Adj. r(COR(ΣR.C(R.F))); ← Adj.InverseFisherZ(N₁,...,Nx);
    Adj.Rho(A.R) ← Adj. r(COR(ΣR.C(R.F)));
}
```

At 106, the operation can include determining webpage attributes that further influence ranking and traffic when coupled to ranking factors. In some instances, attributes of a webpage can be used to determine ranking factors in the context of a ranking factor response model. As discussed above, the ranking factors can include factors such as page load speed, security, engagement time, etc. Further, ranking factors can also include a length of time a domain has been registered, or a number of third-party webpages that link to the particular webpage. In some instances, the operation 106 can include determining whether a ranking factor is a webpage specific factor (e.g., also referred to as a server-side attribute) that can be updated or modified or otherwise controlled by a webpage administrator, for example. For example, while the length of time a domain has been registered can be a relevant ranking factor, the operation 106 can include determining that the time associated with a domain cannot be manipulated for the purposes of the process 100.

An example 108 illustrates an example of webpage attributes associated with ranking factor $X_1$, which corresponds, in this example, to page load speed. In some instances, the ranking factor $X_1$ can be a function of webpage specific attributes, represented as $X_1=F(Y_1, Y_2, Y_3, \ldots, Y_N)$. By way of example, and without limitation, the attribute $Y_1$ can correspond to an image size (e.g., as a size of images decreases (in general), a speed of loading a webpage including the images can increase); $Y_2$ can correspond to whether the webpage is optimized based on a type of browser, such as a desktop browser or a mobile browser for a smartphone, for example; and $Y_3$ can correspond to a location of a server (e.g., in general, a shorter distance between a server hosting a webpage and a device requesting the webpage improves page load time). However, it can be understood that webpage attributes can be associated with a plurality of ranking factors. For example, decreasing a size of an image can improve a page load time, but an image that is too small can negatively impact an engagement time (e.g., if a resolution or size of the image is too low or below a threshold, users can quickly navigate away from a webpage).

At 110, the operation can include determining a total addressable market by keyword based at least in part on an n-gram analysis of content. For example, the operation 110 can include extracting data from social media channels to determine lists of relevant keywords/key phrases for determining an addressable market. An example 112 illustrates social media content (generically illustrated as "social.media.com") including content directed to phones, for example. An example 114 illustrates a list of keywords/key phrases "phone," "broken phone," "smashed phone," and "water damage." In some instances, the term "phone" can correspond to a seed term that can be used in an n-gram analysis to evaluate multiple related terms to determine keywords/key phrases that are associated with a large number of users that are associated with a large amount of content. That is, the keywords/key phrases "broken phone," "smashed phone," and "water damage" can represent a list of key words/key phrases that are associated with the seed term which reflect additional words associated with the seed term. In some instances, the list of keywords/key phrases can be associated with weighted index values to reorder the list based on a priority or ranking of keywords/key phrases. One exemplary process for calculating a total addressable market by keyword based on an n-gram analysis of content is exhibited in the following pseudocode:

```
G.C ← SocialBrandedChannel(ID).Content
G.U ← SocialBrandedChannel(ID).User
G.Rc ← SocialBrandedChannel(ID).UserReaction {
    If ∀ᵢ, G.Uⱼ (G.Rcⱼ) < 2
    Return NULL
}
G.E ← SocialBrandedChannel(ID).userEngagement
G.PP ← SocialBrandedChannel(ID).userEngagement[TimeStamp]
    As Published Priority Index
G.WI ← Weighted(G.PP)
G.T ← SocialBrandedChannel(ID).contentTitle
G.S ← ΣG.T {
    SQRT(SumProduct(G.RCᵢ + G.Eⱼ)/Sum(G.WI) as WeightedFactor
}
G.H ← SQRT(||A²|| + ||B²||) ∈ G.Rc && G.E
    ∀ᵢ, G.Uⱼ | G.Eⱼ > 1 where
        A ← G.Uᵢ[Node1]
        B ← G.Cᵢ[Node2]
G.RI ← G.S / (G.WI + G.H), order DESC by G.RI
G.Seed ← ∀G.T {
    String ← G.T(String)
    If
(String.contains("the"|"a"|"is"|"of"|"or"|"are"|"were"|"and"|"has"|"was"|
"be"|"it"|"to"|"on"|"for"|"in"|"as")
    As G.T(String.BridgeTerm) {
        Delete G.T(String.BridgeTerm)
    }
    Elseif
(String.contains(" ")) {
    String.split(G.T(String)) }
```

At 116, the operation can include determining a current webpage ranking and/or webpage traffic based on a keyword. For example, the operation 116 can include using one or more automated scripts or scrapers to submit a keyword (e.g., "broken phone") to one or more search engines (e.g., Google, Yahoo, Bing, etc.) to determine where the webpage ranks in associated search results, based on the keyword provided for the search result. In an example 118, a first webpage "1" is associated with a current rank $R_{1,1}$ and a current traffic $T_{1,1}$. Continuing, a second webpage "2" is associated with a current rank $R_{2,1}$ and a current traffic $T_{2,1}$. In some instances, the current rank can be an actual ranking based on current search results, and the current traffic can be actual traffic based on web analytics associated with the current webpage. In some instances, the current ranking and/or current traffic can be provided by a model to calibrate the model relative to measured values. As illustrated in the example 118, the operation 116 can include determining a current rank and traffic for any number of webpages.

At 120, the operation can include simulating one or more changes to the webpage to determine an updated ranking and/or traffic based on changes to be simulated. In some instances, the operation 120 can include adjusting one or more ranking factors associated with a search engine response model. In some instances, the operation 120 can include adjusting one or more webpage attributes associated with a ranking factor response model. For example, a webpage with images of a first size can have an image size factor=1, while a webpage with images of second size can have an image size factor=2. The operation 120 can include updating numerical values of attributes or ranking factors to determine a response of the ranking factor response model, the search engine response model, and/or the total addressable market, to determine a future rank and/or a future traffic associated with the simulated change. In the example 118, the first webpage "1" is associated with a future rank $R_{1,2}$ and a future traffic $T_{1,2}$. As illustrated in the example 118, the operation 120 can include determining a future rank and traffic for any number of webpages.

As discussed herein, operations for determining the future rank and/or traffic can be performed for a plurality of search engines, and results can be aggregated to observe rank and/or traffic across a plurality of search engines. Thus, the process 100 can include determining search engine rankings for the webpage associated with the keywords for a plurality of search engines.

At 122, the operation can include applying an update to the webpage based on the updated ranking and/or traffic. For example, the operation 122 can include determining a ranking differential and/or a traffic differential between the current webpage and the simulated webpage, as illustrated in the example 118. In some instances, the operation 122 can include determining if the ranking differential and/or the traffic differential is above a threshold value to determine if the update should be applied to the webpage. Further, the operation 122 can include receiving an indication of the time, monetary expense, processing expense, etc. associated with applying the updated to the webpage (or a plurality of webpages) to determine a cost per increase in ranking and/or traffic.

An example 124 illustrates one update applied to images on a webpage based on the updated ranking and/or traffic. As discussed above, one ranking factor of the webpage ranking can correspond to a page load speed of a webpage. Further, one attribute that the page load speed ranking factor can be based on is image size. Thus, the example 124 illustrates a first set of images 126 associated with a first resolution being downsampled, compressed, or otherwise converted to a second resolution represented by a second set of images 128. In this example, by simulating a change to the webpage associated with reducing a size of images on a webpage, a future ranking and/or future traffic can be determined. And based on the simulated change, the change can be applied to the webpage (as illustrated in the example 124) and changes can be published for public consumption and/or indexing by a search engine, so that a ranking and/or traffic of the webpage can improve accordingly.

In some instances, the operation 122 can include receiving or applying one or more changes to a webpage based at least in part on the simulated changes to the webpage, as discussed herein. For example, the operation 122 can include receiving one or more updates or changes to code, content, structure, metadata, etc. associated with the webpage to implement changes to improve a ranking or traffic associated with the webpage.

Figure 2:
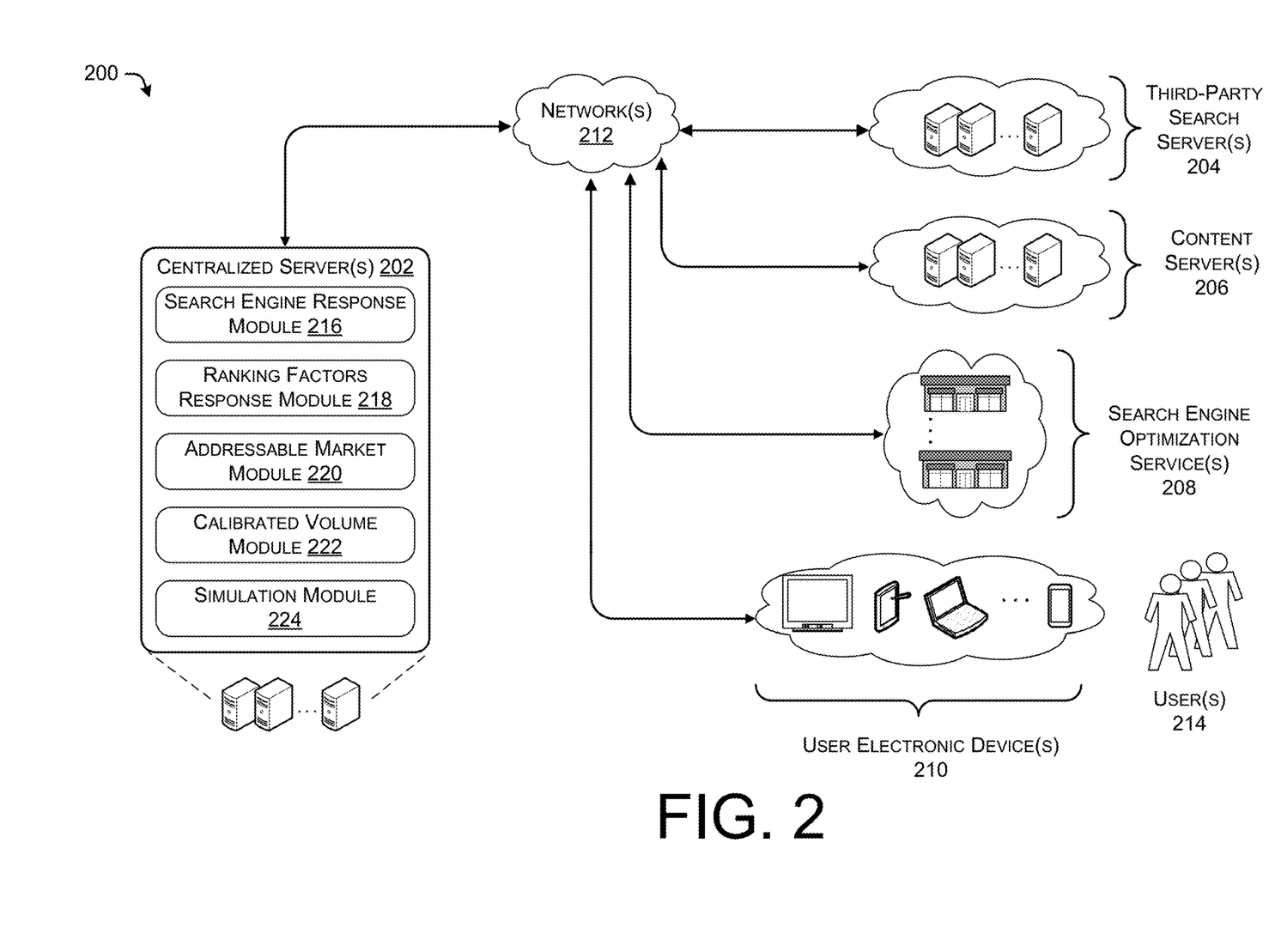
FIG. 2 illustrates an example environment for optimizing and simulating webpage ranking and traffic in accordance with embodiments of the disclosure.

FIG. 2 illustrates an example environment 200 for optimizing and simulating webpage ranking and traffic in accordance with embodiments of the disclosure. In some instances, the environment 200 can include one or more centralized servers 202 in communication with one or more third-party search server(s) 204, content server(s) 206, search engine optimization service(s) 208, and/or user electronic devices 210 via one or more network(s) 212 (e.g., the Internet). In some instances, the third-party search server(s) 204 can represent one or more search engines including, but not limited to, search engines such as Google, Yahoo, Bing, etc. The one or more centralized servers 202 (also referred to as a centralized server 202) can represent a server hosting a webpage that is accessible to the user electronic devices 210 in response to natural or organic searching, as discussed herein. In some instances, the content server(s) 206 can represent one or more servers accessible via the network(s) 212 including content (such as social media content) to determine a size of an addressable market, as discussed herein. Further, in some instances, the search engine optimization services 208 can be an entity associated with generating search engine response model(s) and/or ranking factor response model(s). In some instances, the search engine optimization services 208 can be incorporated into the centralized server 202, and in some cases, the search engine optimization services 206 can be a separate and distinct entity from the centralized server 202.

The centralized server 202 can include one or more modules, such as a search engine response module 216, a ranking factors response module 218, an addressable market module 220, a calibrated volume module 222, and a simulation module 224.

The search engine response module 216 can include functionality to model a response of one or more search engines (e.g., via one or more search engine response models) to determine a rank of a webpage based on a number of ranking factors associated with the webpage. For example, and without limitation, a ranking of a webpage can be based in part on ranking factors such as page load speed (e.g., an amount of time for a webpage to load in response to inputting an address associated with the webpage into a web browser), webpage security (e.g., whether the webpage uses HTTPS security, encryption, etc.), and webpage engagement time (e.g., an amount of time between a user navigating from a search engine to a webpage and back, also referred to as a bounce rate or bounce time). Additional ranking factors can include, but are not limited to: domain age; keyword in a top-level domain; domain registration length of time; public or private owner information associated with a webpage; a number of keywords in webpage content; a number of links associated with the webpage; content length; keyword density; timing of content updates; grammar and spelling; etc. In some instances, the search engine response module 216 can use any algorithm or model to determine an expected ranking of a webpage, including one or more machine learning algorithms. In some instances, the search engine response module 216 can determine a ranking of a webpage based at least in part on a Spearman correlation coefficient, which can be adjusted using a Fisher transformation.

The ranking factors response module 218 can include functionality to determine webpage attributes that influence ranking factors. For a particular ranking factor, for example, the ranking factors response module 218 can include a function based on webpage attributes to determine how a ranking factor can be affected by changes associated with a webpage. In one example, a ranking factor can correspond to "page load speed," and attributes that affect the page load speed can include image size, browser optimization, and server location, to name a few. The ranking factors response module 218 can determine one or more correlations and weights associated with the various attributes to quantify attributes associated with a webpage.

The addressable market module 220 can include functionality to determine a size of a market, such as a number of searches associated with content over a period of time. In some instances, the addressable market module 220 can analyze social media content to determine lists of keywords/key phrases that are associated with user searches for particular content. For example, the addressable market module can use an n-gram analysis on social media channels to determine associations between seed term(s), keyword(s), and key phrase(s) (in some instances, the term "keywords" can include keywords and key phrases). Upon determining a list of relevant keywords/key phrases associated with a particular market, the addressable market module 220 can pass the lists to the calibrated volume module 222, for example, to determine a volume of searches associated with the list of keywords/key phrases.

The calibrated volume module 222 can include functionality to determine a volume of searches associated with the lists of keywords/key phrases. In some instances, the calibrated volume module 222, for each keyword/key phrase, can access a database associated with volume metrics associated with paid search data as a proxy for search volume associated with a keyword/key phrase. For example, the calibrated volume module 222 can include functionality to determine a query volume associated with individual keywords with respect to individual search engines. For example, the calibrated volume module 222 can include functionality to request query volume information from one or more of the third-party search servers 204. In some instances, the calibrated volume module 222 can determine a query volume for any period of time, including but not limited to queries per hour, minute, day, week, month, etc. In some instances, the calibrated volume module 222 can determine a query volume based at least in part on accessing information associated with paid search terms.

Further, the calibrated volume module 222 can include functionality to determine selection rates associated with various ranked results associated with a particular search engine. For example, the calibrated volume module 222 can receive or otherwise determine a selection rate table indicating a likelihood or probability associated with a user (e.g., the user 214) selecting a search result presented as a first search result, as second search result, a third search result, and so on. In some instances, the selection rate can be referred to as a click-through rate. In some cases, the selection rate can correspond to a metric that measures the number of "selections" or "clicks" that a webpage, link, advertisement, etc. receives per number of impressions, based at least in part on the ranking of the webpage with search results. For example, a selection rate for a first search result in a list of search results from a search engine may correspond to 18%, indicating that there is an 18% chance that a user will select the first search result. A selection rate for a second search result in the list of search results may correspond to 10%, indicating there is a 10% chance that a user will select the second search result. Although the aforementioned selection rates are not limiting, they provide one example of how a selection rate may be based on a ranking of the webpage within search results. In some instances, the calibrated volume module 222 can provide for a graphical user interface, for example, to allow user input to change or vary one or more selection rate assumptions. In some instances, the calibrated volume module 222 can aggregate a number of selection rate tables received from a variety of sources to determine an aggregated selection rate table. In some instances, the aggregation can include assigning weights to various selection rate tables based at least in part on a confidence level associated with a source of the selection rate table.

The calibrated volume module 222 can include functionality to calibrate a volume of traffic expected with search results based on a number of factors. In some cases, the calibrated volume module 222 can receive web analytics information associated with a webpage including information associated with some or all traffic received by a webpage. For example, the calibrated volume module 222 can determine an estimate of current traffic based on the list of keywords/key phrases determined by the addressable market module 220, and calibrate the amount of traffic based on actual levels of traffic received by the webpage over time. Thus, the calibrated volume module 222 can calibrate volume estimates based on actual traffic data associated with a webpage over time.

Further, the calibrated volume module 222 can include functionality to calibrate a volume of traffic expected with search results based on a number of market-specific factors. For example, for a particular entity such as a business, the calibrated volume module 222 can adjust an expected volume of traffic up or down based at least in part on geographical limitations (e.g., local, regional, and/or global geographic factors), market cap, business areas, etc.

The simulation module 224 can include functionality to modify at least one aspect or attribute of a webpage and to determine an expected ranking and/or expected traffic based on the modified aspect or attribute of the webpage. In some instances, the simulation module 224 can receive modifications to one or more values associated with attributes or ranking factors and apply the modifications to the search engine response models and/or the ranking factors response models to determine an expected ranking and/or traffic associated with simulated changes.

In some instances, the simulation module 224 can include a plurality of modularized functions for simulating an expected ranking and/or volume of traffic, as detailed herein. For example, the simulation module 224 can include functionality to perform a multivariate regression analysis based on automated regression, and select a classification algorithm based on an accuracy against targeted data sets. In some instances, a regression/classifications algorithm may be pre-selected through automated evaluations of the level of well-fitness and accuracy of various data modeling configurations based on one or more effect variables and regressors. In some instances, an effect variable is the Y-Intercept. A regressor variable is an explanatory or predictor variable that effects the effected response variable, the Y-Intercept. For regression algorithms that require multi-path traversals, classifications can correspond to a mode of the classes, otherwise referred to as the mean prediction (regression) of the individual paths. These selectable regression/classification algorithms may include one or more of: a linear algorithm (e.g., Linear Discrimination Analysis (LDA)); a non-linear algorithm (e.g., Classification and Regression Trees Analysis (CART), k-Nearest Neighbors (kNN), etc.); or a complex non-linear algorithm (e.g., Support Vector Machines (SVM), SVM with a limited kernel, Random Forest (RF), etc.).

Further, the simulation module 224 may include functionality to identify highly correlated variable associations, and simulate predictive outcomes to determine top optimization targets that may result in prioritized increased lift in conversions, traffic, rankings for individual webpage basis based on target page data sets such as web analytics performance or behavioral audience engagement data. Further, the simulation module 224 may include functionality to analyze groups of influencer variables representing attributes of webpage traffic and engagement such as visits, time on page, bounces, links above the fold, links below the fold, readability indices (e.g., a Flesch-Kinkaid readability index), size of images, etc. Further, the simulation module 224 can partition these data sets into two sets, with a first data set to be used for testing, and a second data set to be used for validating. Testing data can be used to conduct machine-learning training to continuously evaluate newly integrated data sets within the data frame for most favorable and accurate regression model selection and multivariate correlation evaluations to apply for optimal predictive simulated results. Validating data can be used to compare and contrast testing data output against a portion of the a priori data sets assigned to a data frame prior to adjusting into a posterior results, to assess the validity of the predictions output, the accuracy of the machine-determined regression model selection, the regression model results, and/or a ARIMA (Autoregression Integrated Moving Average) forecast model based on monthly, weekly, or daily frequencies.

In some instances, the simulation module 224 can generate an output file including results of the simulation operations. Further, the simulation module can generate one or more graphs or visualizations illustrating the results of the simulation compared to based line search engine ranking and traffic volumes, as discussed herein. In some instances, the simulation module 224 can create a connector API to transform output and images to a visualization tool for use in connection with an executive level dashboard, for example.

In some instances, integrated data sets mapped to a data frame within the simulation module 224 variable influencers (e.g., regressors) against the Y-Intercept effected variable may need to be transformed into normalized scale for P-values <Alpha (0.05). An example of this normalization fitting process is to transform a selected data set of web analytics or webpage engagement data into linear models for probability modeling with confidence level set to 95% with Alpha of 5%, exhibited in the following exemplary psuedocode:

```
[newVar]  =  lm([Y-InterceptVar]~[Regressors  X_1,...,X_n],
data  = [dataSource])
Confint([newVar], level = 0.95),
where Confint = confidence interval computation for parameters in a fitted model.
```

Further, the simulation module 224 may identify variable influencers (e.g., regressors) and output the results in a series of visualizations ranging from scatterplots to histograms enabling an optimal view of monotonicity, heteroscedasticity, and distribution normality. In some instances, the visualizations can be used to create a graphical representation of a ratio of influence per each normalized influencer variable (e.g., a regressor) against an effect variable (the Y-Intercept), such as mapped to a conversion variable effected by the explanatory regressor variables.

In some cases, the simulation module 224 can further identify the validity and/or reliability of the data results for statistical significance on some or all variables using frequency distributions, accuracy modeling using predictors and influence of proximity, cross-validation, etc. The simulation module 224 can further transform relevant coefficients into normally distributed Z values, then can calculate the mean of such normally distributed Z values. Further, the simulation module 224 can generate an inverse of the transformation based on an adjusted Rho value. Additionally, the simulation module 224 can include functionality to adjust predictive outcomes based on a calibration of predictive volumetric parameters determined by the simulation module based on regressive industry-level data and/or market-level data such as year-over-year monthly trends in ranking, traffic, or searches.

In some instances, the simulation module 224 can include functionality to determine a baseline ranking and/or volume associated with one or more webpages. For example, the simulation module 224 can query one or more search engines provided by the third-party search servers 204 with one or more keywords of the addressable market module 220 to determine a ranking of a webpage hosted by the centralized server 202 within search results provided by the third-party search servers 204. For example, the simulation module 224 can periodically perform searches using one or more keywords, determine a ranking of a webpage in response to the one or more keywords, and store the one or more rankings in a ranking table. The simulation module 224 can determine rankings for keywords with respect to one or more search engines. The simulation module 224 can determine rankings at any regular or irregular interval or frequency.

Additional aspects of the centralized server(s) 202 and keyword ranking operations are discussed further in connection with FIGS. 3-5, below.

Figure 3:
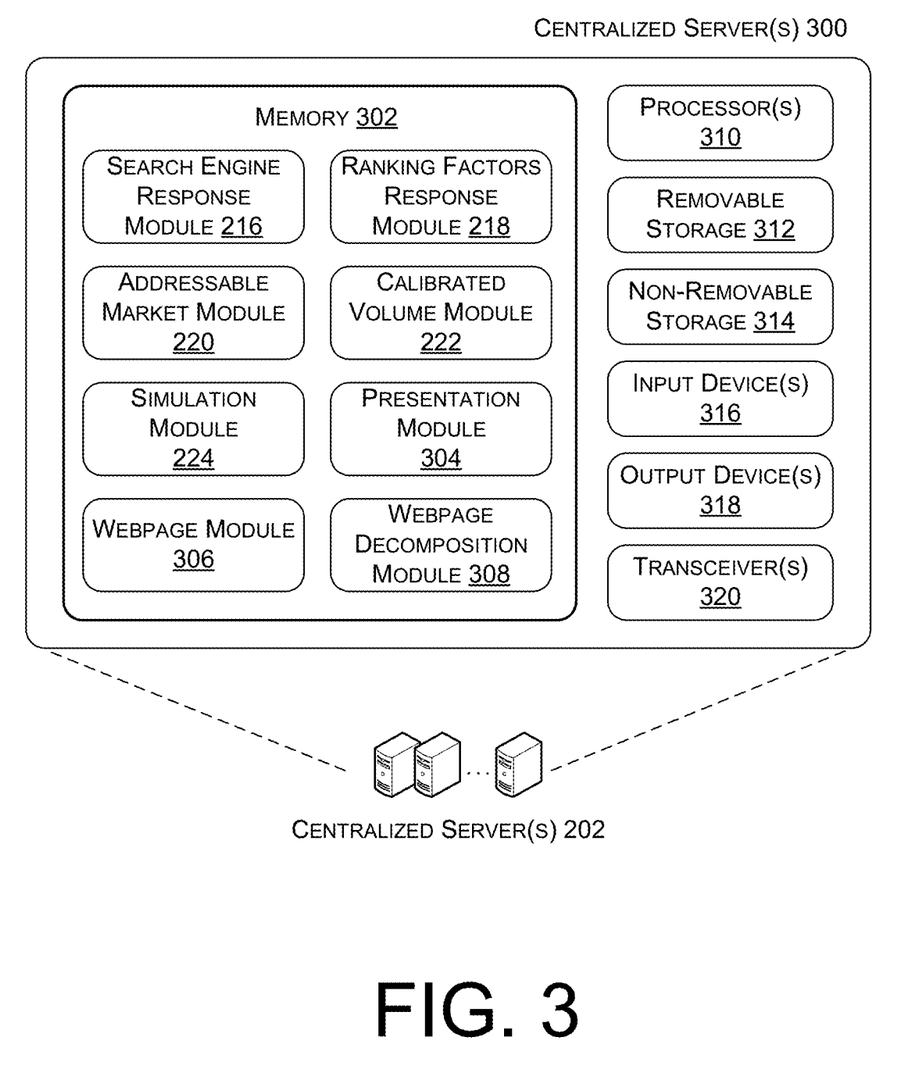
FIG. 3 illustrates an example centralized server configured to optimize and simulate webpage ranking and traffic in the context of search engine optimization.

FIG. 3 illustrates an example centralized server 300 configured to optimize and simulate webpage ranking and traffic in the context of search engine optimization. The centralized server 300 can correspond to the centralized server(s) 202 of FIG. 2, and can be used to implement the various operations described herein. It is to be understood in the context of this disclosure that the centralized server 300 can be implemented as a single device or as a plurality of devices with modules and data distributed among them. For example, the centralized server can include memory 302 storing the search engine response module 216, the ranking factors response model 218, the addressable market module 220, the calibrated volume module 222, the simulation module 224, a presentation module 304, a webpage module 306, and a webpage decomposition module 308, as described herein. Also, the centralized server 300 includes processor(s) 310, a removable storage 312 and non-removable storage 314, input device(s) 316, output device(s) 318, and transceiver(s) 320.

In various embodiments, memory 302 is volatile (such as RAM), non-volatile (such as ROM, flash memory, etc.) or some combination of the two. The search engine response module 216, the ranking factors response module 218, the addressable market module 220, the calibrated volume module 222, the simulation module 224, the presentation module 304, the webpage module 306, and the webpage decomposition module 308 stored in the memory 302 can comprise methods, threads, processes, applications or any other sort of executable instructions. The search engine response module 216, the ranking factors response module 218, the addressable market module 220, the calibrated volume module 222, the simulation module 224, the presentation module 304, the webpage module 306, and the webpage decomposition module 308 can also include files and databases.

Details of the search engine response module 216, the ranking factors response module 218, the addressable market module 220, the calibrated volume module 222, and the simulation module 224 are provided above in the discussion of FIGS. 1 and 2.

In some embodiments, the presentation module 304 can include functionality to present a current ranking and/or traffic along with a simulated ranking and/or traffic in connection with various graphical user interfaces. In some instances, the presentation module 304 provides a simplified interface to quickly and easily illustrate a simulated performance of a webpage with respect to natural search associated with a list of keywords. The presentation module 304 can provide any graphs, charts, or illustrates to various computing devices (e.g., associated with the centralized server 202 or the search engine optimization services 208) to convey keyword performance, as discussed herein. In one example, the presentation module 304 can present a graphical user interface including a snapshot of a webpage over time and associated rankings and/or traffic over time.

In some embodiments, the webpage module 306 can include functionality to generate, edit, and/or host a webpage for optimization, as discussed herein. In some instances, webpages associated with the webpage module 306 can be developed using a variety of programming languages or techniques, including but not limited to: HTML; HTML5; PHP; JavaScript; Java; Python; Ruby; Perl; C; C++; Shell; C #; Hack; Erlang; Haskell; CSS; etc. Further, webpages can be developed using any platform, such as Adobe Experience Manager (AEM), and can be compatible with any operating system (e.g., Android, iOS, Windows, Chrome OS, Unix, etc.). Further, in some examples, the webpage module 306 can receive one or more edits to implement webpage optimizations based at least in part on the simulated changes, as discussed herein.

In some embodiments, the webpage decomposition module 308 can include functionality to receive a current webpage or a webpage to be simulated to extract ranking factors and/or attributes of the webpages to be used in connection with one or more search engine response models and/or one or more ranking factors response models. For example, the webpage decomposition module 308 can parse a webpage to determine components parts with respect to a keyword, such as a frequency of the keyword in the content, a length of content, a number of images/video, a number of links, etc.

In some embodiments, the one or more processor(s) 310 are central processing units (CPUs), graphics processing units (GPUs), or both CPU and GPU, or other processing units or components known in the art.

The centralized server 300 also includes additional data storage devices (removable and/or non-removable) such as, for example, magnetic disks, optical disks, or tape. Such additional storage is illustrated in FIG. 3 by removable storage 312 and non-removable storage 314. Tangible computer-readable media can include volatile and nonvolatile, removable and non-removable media implemented in any method or technology for storage of information, such as computer readable instructions, data structures, program modules, or other data. Memory 302, removable storage 312 and non-removable storage 314 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 300. Any such tangible computer-readable media can be part of the centralized server 300.

The centralized server 300 also can include input device(s) 316, such as a keypad, a cursor control, a touch-sensitive display, voice input device, etc., and output device(s) 318 such as a display, speakers, printers, haptic feedback, etc. These devices are well known in the art and need not be discussed at length here.

As illustrated in FIG. 3, the centralized server 300 also includes one or more wired or wireless transceiver(s) 320. For example, the transceiver(s) 320 can include a network interface card (NIC), a network adapter, a LAN adapter, or a physical, virtual, or logical address to connect to the network(s) 212, the third-party search servers 204, the content servers 206, the search engine optimization services 208, and the user electronic devices 210, for example. To increase throughput when exchanging wireless data, the transceivers 320 can utilize multiple-input/multiple-output (MIMO) technology. The transceiver(s) 320 can comprise any sort of wireless transceivers capable of engaging in wireless, radio frequency (RF) communication. The transceivers 320 can also include other wireless modems, such as a modem for engaging in Wi-Fi, WiMAX, Bluetooth, or infrared communication.

Figure 4:
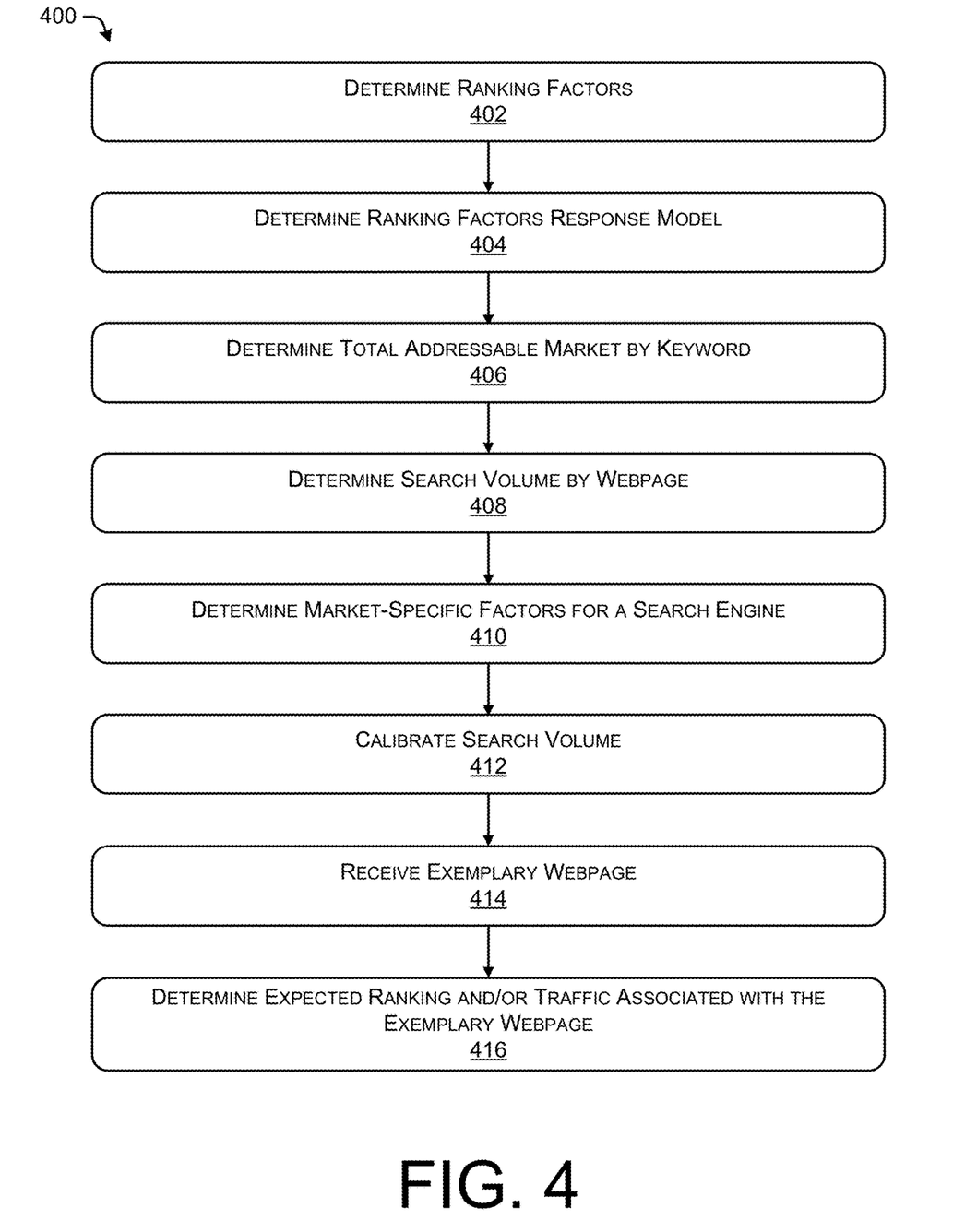
FIG. 4 illustrates an example process for optimizing and simulating a webpage to determine ranking and traffic.
Figure 5:
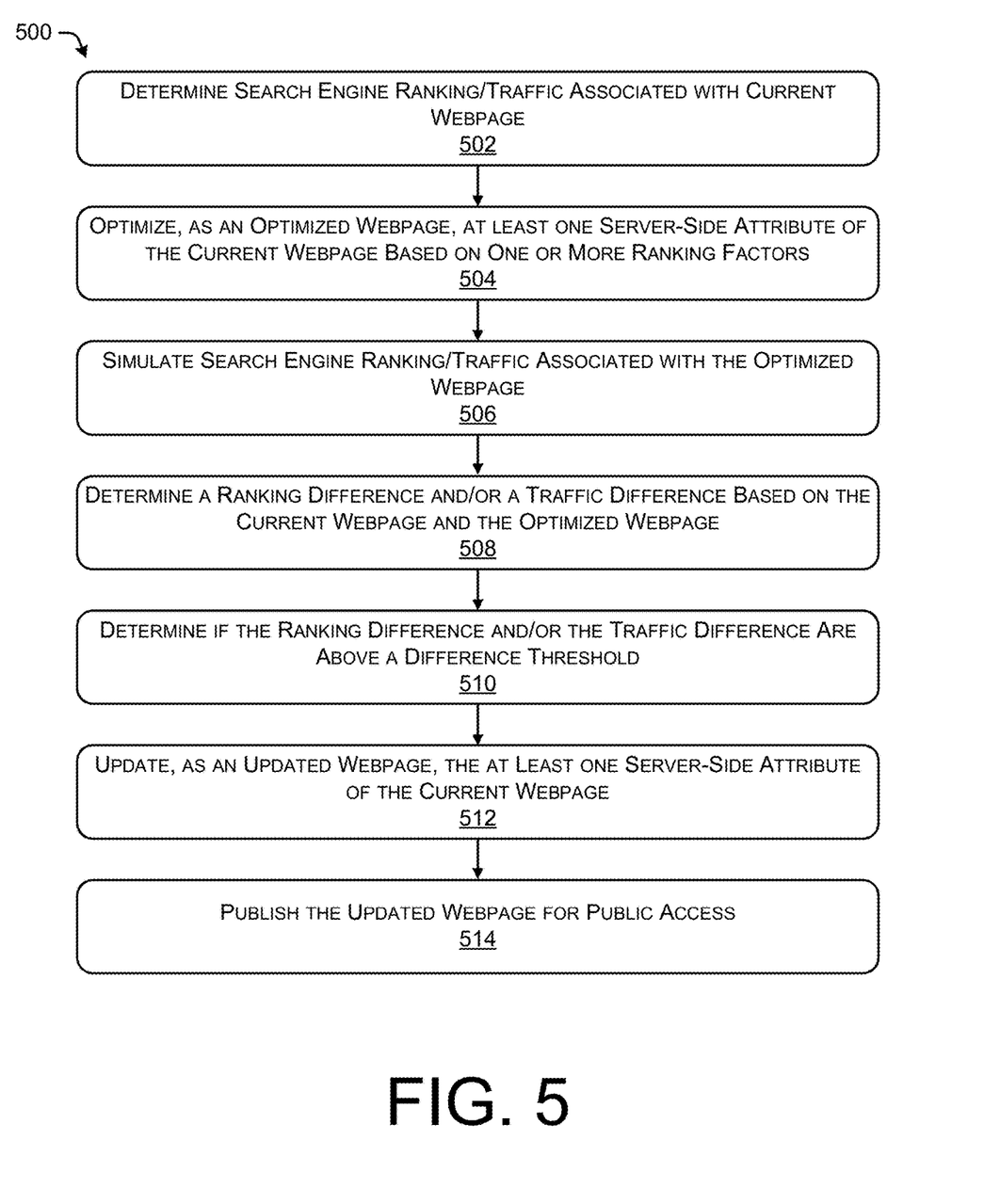
FIG. 5 illustrates an example process for optimizing and simulating a webpage to determine traffic and ranking prior to implementing changes on the webpage.

FIGS. 4-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for optimizing and simulating a webpage to determine ranking and traffic. The example process 400 can be performed by a centralized server (e.g., the centralized server 202 or 300), for example. Further, some or all of the process 400 can be performed by one or more components in the environment 200.

At 402, the operation can include determining ranking factors. As discussed herein, in some instances, a ranking of a webpage in response to a search using a keyword/key phrase for a particular search engine can be based in part on one or more ranking factors. For example, and without limitation, ranking factors can include page load speed, webpage security, and webpage engagement time. Additional ranking factors can include, but are not limited to: domain age; keyword in a top-level domain; domain registration length of time; public or private owner information associated with a webpage; keywords in webpage content; number of links associated with the webpage; content length; keyword density; timing of content updates; grammar and spelling; etc. In some instances, the search engine response module 216 can use any algorithm or model to determine an expected ranking of a webpage, including one or more machine learning algorithms.

In some instances, the operation 402 can include receiving a search engine response model (e.g., from the search engine optimization services 208), and in some instances, the operation 402 can include determining a search engine response model. For example, the operation 402 can include making a series of webpages and changing one attribute of the webpage to determine how a ranking is affected over time. By varying one attribute at a time, and repeating the operations over time, the operation 402 can determine a search engine response model for ranking factors that can be changed, as discussed herein. In some instances, the operation 402 can including varying one or more coefficients of a search engine response model to tune or calibrate the response model, and in some instances, the search engine response model can be based at least in part on a Spearman correlation coefficient and/or a Fisher transformation.

At 404, the operation can include determining a ranking factors response model. For example, individual ranking factors can be based at least in part on one or more attributes of a webpage. The operation 404 can include determining attributes that affect the various ranking factors, and determining correlation coefficients or level of interaction between the various attributes and ranking factors. In some instances, the ranking factors response model can be based at least in part on a Spearman correlation coefficient and/or a Fisher transformation.

At 406, the operation can include determining a total addressable market by keyword. As discussed herein, the operation 406 can include receiving or determining one or more seed terms associated with a market or business and analyzing online content (e.g., social media channels) to determine connections between individuals, content, search results, etc. In some instances, the operation 406 can include determining a social media graph and performing analysis on the graph to determine a length of vectors coupling individuals, content, search results, etc. In some instances, the operation 406 can include determining lists of keywords/key phrases, which can represent a substantially comprehensive search market associated with a business entity or particular segment of a market.

At 408, the operation can include determining search volume by page. For example, for the list of the keywords/key phrases determined in the operation 406, the operation 408 can include determining a search volume for a particular search engine associated with individual keywords/key phrases. In some instances, the operation 408 can include determining a volume of search traffic based on information provided by a third-party search server, for example, in connection with information provided for paid search opportunities. For example, the third-party search server can provide an estimate or actual information of a number of searches using a keyword/key phrase received by the search engine over a period of time (e.g., hour, day, week, month, etc.), which can correspond to the search volume for natural search as well. In some instances, the operation 408 can be performed for any number of keywords/key phrases, and for any number of webpages.

At 410, the operation can include determining market-specific factors for a search engine. For example, in some instances, the search volume discussed above can be determined based on market-specific factors that can be adjusted to extrapolate or apply the models discussed herein to different market types. For example, the search volume, for a first market (e.g., for construction equipment) can vary from a search volume for a second market (e.g., for computer software). The search engine response models (e.g., based on the ranking factors) and the ranking factors response model (e.g., based on webpage attributes) can offer different responses for different markets. In some instances, the operation 410 can include varying one or more weights associated with one or more parameters in one or more correlation models based on market-specific factors associated with a search engine.

At 412, the operation can include calibrating the search volume. In some instances, the operation 412 can include receiving web analytics associated with a current webpage to determine an amount of traffic arriving at the webpage, as well as the sources of such traffic. From the web analytics, the operation 412 can determine an amount of the total traffic with a source of organic or natural search. In some cases, the actual amount of organic traffic received by a webpage over a period of time can be compared to the estimated amount of traffic to determine whether to adjust the model so that an estimated amount of traffic (based on a configuration of the current webpage) can be within a threshold amount of the actual traffic associated with a webpage.

At 414, the operation can include receiving an exemplary webpage. In some instances, the exemplary webpage can correspond to a current webpage (e.g., a webpage that is publicly accessible) or an updated webpage for optimization and simulation, as discussed herein. In some examples, the updated webpage can be a mock-up or a prototype of a webpage with changes prior to publishing the webpage for public access. In some instances, the operation 414 can include receiving a webpage and quantifying attributes associated with the webpage, and applying the quantified attributes as parameters in one or more models.

At 416, the operation can include determining an expected ranking and/or traffic associated with the exemplary webpage. For example, the operation 416 can include applying the parameters associated with the exemplary webpage to the one or more models to determine an expected ranking and/or traffic associated with the exemplary webpage. In some instances, the operation 416 can include determining a differential between a current ranking and/or traffic associated with a current webpage and an expected ranking and/or traffic associated with the exemplary webpage.

FIG. 5 illustrates an example process 500 for optimizing and simulating a webpage to determine traffic and ranking prior to implementing changes on the webpage. The example process 500 can be performed by a centralized server (e.g., the centralized server 202 or 300), for example. Further, some or all of the process 500 can be performed by one or more components in the environment 200.

At 502, the operation can include determining a search engine ranking and/or traffic associated with a current webpage. For example, the operation 502 can include using one or more automated scripts or scrapers to submit a keyword (e.g., "broken phone") to one or more search engines (e.g., Google, Yahoo, Bing, etc.) to determine where the webpage ranks in associated search results, based on the keyword provided for the search result. Further, the operation 502 can include receiving web analytics associated with the current webpage to determine source(s) of traffic arriving at the current webpage.

At 504, the operation can include optimizing, as an optimized webpage, at least one server-side attribute (e.g., a ranking factor configurable or adjustable by a modifying a portion of a webpage stored on a server) of the current webpage based on one or more ranking factors. As discussed above, a ranking of a webpage can be based on a plurality of ranking factors. It can be understood that some ranking factors cannot be directly affected by an owner or manager of the current webpage (e.g., a number of third-party webpages linking to current webpage). As such, the operation 504 can include optimizing attributes of a webpage that can be adjusted by the webpage owner or manager (e.g., updating security, providing a webpage optimized for mobile users, reducing image size, etc.).

At 506, the operation can include simulating a search engine ranking and/or traffic associated with the optimized webpage. As discussed herein, the operation 506 can include determining one or more search engine response models, one or more ranking factors response models, and a total addressable market by keyword with a volume adjusted and calibrated based on market-specific factors. A simulated search engine ranking and/or traffic can be determined based on the optimization applied to the current webpage, for example.

At 508, the operation can include determining a ranking difference and/or a traffic difference based on the current webpage and the optimized webpage. In some instances, a simulated ranking can affect a simulated volume based at least in part on a selection rate associated with the simulated ranking. Further, in some instances, the simulated traffic can be based in part on an increase or decrease to a total addressable market, for example, based on one or more changes to content associated with a webpage. In some instances, the operation 508 can include determining a ranking difference and/or a traffic difference for a plurality of keywords associated with a webpage, determining a ranking difference and/or a traffic difference for a keyword across a plurality of webpages, and/or determining a ranking difference and/or a traffic difference for a plurality of keywords/key phrases across a plurality of webpages At 510, the operation can include determining if the ranking difference and/or the traffic difference are above individual difference thresholds. In some examples, where a plurality of ranking differences and/or traffic differences are determined for a plurality of keyword/key phrases and/or for a plurality of web pages, the operation 510 can include determining an aggregated ranking difference (e.g., by summing increases and/or decreases) and/or determining an aggregated traffic difference (e.g., by summing increases and/or decreases).

At 512, the operation can include updating, as an updated webpage, the at least one server-side attribute of the current webpage. In some instances, the operation 512 can include changing one or more of code, content, formatting, etc. associated with the webpage, as discussed herein.

At 514, the operation can include publishing the updated webpage for public access. For example, the operation 514 can include hosting the updated webpage on a server and allowing the updated webpage to be indexed by a search engine for public accessibility. In some instances, after a period of time following the publishing of the updated web page, the operation 514 can include determining a new ranking and/or traffic associated with the updated webpage to determine an accuracy of the optimizations and simulations, as discussed herein.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   a memory storing computer-executable instructions that, when executed by the one or more processors, cause the one or more processors to perform operations comprising:
   determining one or more ranking factors associated with a webpage, a search engine ranking of the webpage being determined based at least in part on the one or more ranking factors;
   determining one or more webpage attributes associated with the webpage, a ranking factor of the one or more ranking factors being determined based at least in part on the one or more webpage attributes;
   determining an addressable market of a good or a service associated with the webpage based at least in part on an n-gram analysis of one or more keywords that correspond to the good or the service, the one or more keywords being based at least in part on content associated with a third-party webpage that is separate from the webpage;
   determining a current ranking and a current traffic level associated with the webpage based on results from a search engine, the results based at least in part on a keyword;
   simulating at least one change to the webpage to determine an updated ranking and an updated traffic level based at least in part on the at least one change, the simulating the at least one change to the webpage based at least in part on a coefficient model determining correlations between individual webpage attributes and individual ranking factors;
   receiving, via a graphical user interface, a user input indicating a preferred selection rate corresponding to a probability that a search result associated with the updated ranking will be selected in a group of search results;
   applying the at least one change to the webpage to generate an updated webpage, the applying based at least in part on the updated ranking, the updated traffic level, and the user input indicating the preferred selection rate; and
   publishing the updated webpage for public access and for indexing by the search engine.

2. The system of claim 1, the operations further comprising updating at least a portion of the one or more webpage attributes based at least in part on the at least one change to the webpage.

3. The system of claim 1, the operations further comprising:
   receiving at least one seed term associated with the webpage;
   analyzing the content associated with the third-party webpage to determine the one or more keywords associated with the at least one seed term, the one or more keywords based at least in part on the n-gram analysis; and
   determining a volume of traffic originating from the search engine, the volume of traffic based at least in part on the one or more keywords.

4. The system of claim 3, the operations further comprising:
   receiving web analytics associated with the webpage;
   calibrating, as a calibrated volume of traffic, the volume of traffic based at least in part on the web analytics; and
   simulating the at least one change to the webpage to determine the updated ranking and the updated traffic level based at least in part on the calibrated volume of traffic.

5. A system comprising:
   one or more processors; and
   a memory storing computer-executable instructions that, when executed by the one or more processors, cause the one or more processors to perform operations comprising:
   determining one or more ranking factors associated with a webpage;
   determining one or more webpage attributes associated with the webpage;
   determining an addressable market of a good or a service associated with the webpage based at least in part on an n-gram analysis of one or more keywords that correspond to the good or the service, the one or more keywords being based at least in part on content associated with a third-party webpage that is separate from the webpage;

determining a current ranking and a current traffic level associated with the webpage based on results from a search engine;

simulating at least one change to the webpage to determine an updated ranking and an updated traffic level based at least in part on the at least one change, the simulating the at least one change to the webpage based at least in part on a coefficient model determining correlations between individual webpage attributes and individual ranking factors;

receiving, via a graphical user interface, a user input indicating a preferred selection rate corresponding to a probability that a search result associated with the updated ranking will be selected in a group of search results; and applying the at least one change to the webpage to generate an updated webpage based at least in part on the updated ranking, the updated traffic level, and the user input indicating the preferred selection rate.

6. The system of claim 5, the operations further comprising:

receiving at least one seed term associated with the webpage;

analyzing the content associated with the third-party webpage to determine the one or more keywords associated with the at least one seed term, the one or more keywords based at least in part on the n-gram analysis; and determining a volume of traffic originating from the search engine, the volume of traffic based at least in part on the one or more keywords.

7. The system of claim 6, the operations further comprising:

determining, for a keyword of the one or more keywords, a weighted index value; and ordering the keyword within the one or more keywords based on a priority associated with the weighted index value.

8. The system of claim 5, the operations further comprising estimating a search engine ranking of the webpage based at least in part on a search engine response model based at least in part on the one or more ranking factors.

9. The system of claim 5, the operations further comprising determining the one or more webpage attributes based on at least one of webpage content, webpage format, or webpage security associated with the webpage.

10. The system of claim 5, the operations further comprising publishing the updated webpage for public access and for indexing by the search engine.

11. The system of claim 5, the operations further comprising:

determining a ranking difference between the current ranking and the updated ranking;

determining that the ranking difference is above a threshold ranking difference value; and applying the at least one change to the webpage to generate the updated webpage based at least in part on the ranking difference being above the threshold ranking difference value.

12. The system of claim 5, the operations further comprising:

determining a traffic difference between the current traffic level and the updated traffic level;

determining that the traffic difference is above a threshold traffic difference value; and applying the at least one change to the webpage to generate the updated webpage based at least in part on the traffic difference being above the threshold traffic difference value.

13. A processor-implemented method comprising:

determining one or more ranking factors associated with a webpage;

determining one or more webpage attributes associated with the webpage;

determining an addressable market of a good or a service associated with the webpage based at least in part on an n-gram analysis of one or more keywords that correspond to the good or service, the one or more keywords being based at least in part on content associated with a third-party webpage that is separate from the webpage;

determining a current ranking and a current traffic level associated with the webpage based on results from a search engine;

simulating at least one change to the webpage to determine an updated ranking and an updated traffic level based at least in part on the at least one change, the simulating the at least one change to the webpage based at least in part on a coefficient model determining correlations between individual webpage attributes and individual ranking factors;

receiving, via a graphical user interface, a user input indicating a preferred selection rate corresponding to a probability that a search result associated with the updated ranking will be selected in a group of search results; and applying the at least one change to the webpage to generate an updated webpage, the applying based at least in part on the updated ranking, the updated traffic level, and the user input indicating the preferred selection rate.

14. The processor-implemented method of claim 13, further comprising:

receiving at least one seed term associated with the webpage;

analyzing the content associated with the third-party webpage to determine the one or more keywords associated with the at least one seed term, the one or more keywords based at least in part on the n-gram analysis; and determining a volume of traffic originating from the search engine, the volume of traffic based at least in part on the one or more keywords.

15. The processor-implemented method of claim 14, further comprising:

determining, for a keyword of the one or more keywords, a weighted index value; and ordering the keyword within the one or more keywords based on a priority associated with the weighted index value.

16. The processor-implemented method of claim 13, further comprising estimating a search engine ranking of the webpage based at least in part on a search engine response model based at least in part on the one or more ranking factors.

17. The processor-implemented method of claim 13, further comprising determining the one or more webpage attributes based on at least one of webpage content, webpage format, or webpage security associated with the webpage.

18. The processor-implemented method of claim 13, further comprising:
   determining a traffic difference between the current traffic level and the updated traffic level;
   determining that the traffic difference is above a threshold traffic difference value; and
   applying the at least one change to the webpage to generate the updated webpage based at least in part on the traffic difference being above the threshold traffic difference value.

19. The system of claim 1, wherein the operations further comprise presenting an interactive element with a graphical presentation of the updated ranking at the graphical user interface, wherein receiving the user input comprises receiving an interaction with the interactive element.

20. The processor-implemented method of claim 13, further comprising presenting an interactive element with a graphical presentation of the updated ranking at the graphical user interface, wherein receiving the user input comprises receiving an interaction with the interactive element.

* * * * *